United States Patent
Sorani et al.

(10) Patent No.: US 12,250,240 B2
(45) Date of Patent: Mar. 11, 2025

(54) SYSTEMS AND METHODS FOR ASSESSING RISK IN NETWORKED VEHICLE COMPONENTS

(71) Applicant: Cymotive Technologies Ltd., Tel Aviv-Jaffa (IL)

(72) Inventors: Mordechay Sorani, Rishot Lezion (IL); Amir Sharon, Tel Mond (IL)

(73) Assignee: Cymotive Technologies Ltd., Tel Aviv-Jaffa (IL)

( * ) Notice: Subject to any disclaimer, the term of this patent is extended or adjusted under 35 U.S.C. 154(b) by 430 days.

(21) Appl. No.: 17/622,252

(22) PCT Filed: Jun. 22, 2020

(86) PCT No.: PCT/IL2020/050694
§ 371 (c)(1),
(2) Date: Dec. 23, 2021

(87) PCT Pub. No.: WO2020/261262
PCT Pub. Date: Dec. 30, 2020

(65) Prior Publication Data
US 2022/0394053 A1 Dec. 8, 2022

Related U.S. Application Data

(60) Provisional application No. 62/865,370, filed on Jun. 24, 2019.

(51) Int. Cl.
*H04L 9/40* (2022.01)

(52) U.S. Cl.
CPC .............................. *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 10,262,143 B2 * | 4/2019 | Thomas | G06F 30/20 |
| 10,616,259 B2 * | 4/2020 | North | H04L 63/1433 |
| 11,036,194 B2 * | 6/2021 | Bushey | G05B 13/04 |
| 11,252,010 B2 * | 2/2022 | Schmid | H04L 63/102 |
| 11,874,752 B1 * | 1/2024 | Khan | B60L 53/66 |
| 11,899,785 B2 * | 2/2024 | Aue | G06F 21/552 |
| 2013/0191919 A1 * | 7/2013 | Basavapatna | H04L 63/20 726/25 |
| 2016/0255154 A1 * | 9/2016 | Kim | H04L 63/08 726/25 |

(Continued)

OTHER PUBLICATIONS

Sotirios Katsikeas, "vehicleLang: a probabilistic modeling and simulation language for vehicular cyber attacks", 2018, 92 pages. (Year: 2018).*

*Primary Examiner* — Yonas A Bayou
(74) *Attorney, Agent, or Firm* — The IP Law Firm of Guy Levi, LLC

(57) ABSTRACT

The disclosure relates to systems and methods for determining a cyber risk level of an asset node associated with one or more functional aspects of a vehicle and assessing a node vulnerability score. Specifically, the disclosure relates to systems and methods of identifying, analyzing, and remediating vulnerabilities of networked vehicle components to various malicious exploits, by simulating attack on one or more vehicle nodes using known vulnerabilities under operational conditions.

21 Claims, 2 Drawing Sheets

(56) References Cited

U.S. PATENT DOCUMENTS

| | | | | |
|---|---|---|---|---|
| 2018/0075243 A1* | 3/2018 | Thomas | .................. | G06F 30/20 |
| 2018/0205754 A1* | 7/2018 | North | ..................... | H04L 63/145 |
| 2019/0114437 A1* | 4/2019 | Kim | ..................... | G06F 21/577 |
| 2020/0389474 A1* | 12/2020 | Levy | ................... | H04L 63/1416 |
| 2022/0245260 A1* | 8/2022 | Priller | ................... | G06F 21/577 |

* cited by examiner

SYSTEMS AND METHODS FOR ASSESSING RISK IN NETWORKED VEHICLE COMPONENTS

COPYRIGHT NOTICE

A portion of the disclosure hereinbelow contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems and methods for enabling the assessment of vehicle security. Specifically, the disclosure is directed to systems and methods of identifying, analyzing and remediating vulnerabilities of networked vehicle components to various malicious exploits.

Shares of electronic and electric components of a vehicles have been increasing among other various parts and systems of vehicles, as does the importance of software of a vehicle with thousands of new software vulnerabilities introduced every year. As more and more critical car functionality is managed by software, the complexity of software grows exponentially. Unfortunately, this often leads to vulnerabilities, especially as testing all possible attack scenarios before shipment is unrealistic. In addition, communication between electronic control units (ECUs) based on a distributed network in a vehicle may enable the provision of various functions and services. Thus, more emphasis has been placed on the importance of vehicular functional safety.

Vehicular functional safety is applied to increase a product reliability and fault tolerance by decreasing a failure rate of electronic parts of a vehicle, increase safety for a driver through failure diagnosis and safety mechanism, increase an availability of a vehicle through a product design process and a maintenance and repair system, and the like.

Few hundreds vulnerabilities, specifically relevant for cars fleets, many of which can be exploits in less than 30 days have thus far been identified. Thus, the automobile industry faces an emerging challenge in the area of cybersecurity. For original equipment manufacturers (OEMs), Tier 1 suppliers, car dealers, service providers, car owners and drivers, cyberattacks can now be considered a reality.

This is exacerbated with connected vehicles, where more and more key vehicle functions rely also on software rather mainly on hardware. Consequently, as vehicles become more and more automated and connected with the outside world, security threats grow as well. Vulnerabilities arise particularly when reduced development and time to market constraints substantially and adversely affect product testing. These vulnerabilities might not even be uncovered until after millions of vehicles have been released. Therefore, it's important to have a continuous handle on the threats and vulnerabilities of the vehicles' connected components.

Moreover, the current trend of development in infotainment, smartphone telematics, diagnostics and autonomous car features such as autopilot, lane assist and the like would only hasten integration of increasing number of the car's components with external systems and applications. This further exposes cars to serious threats.

These and other shortcomings of the current state of affairs are addressed by the following disclosure, figures and claims.

SUMMARY

Disclosed, in various exemplary implementations, are systems and methods of identifying, analyzing and remediating vulnerabilities of connected vehicle components to various malicious exploits.

In an exemplary implementation provided herein is a computer-implemented method of evaluating risk for a vehicle, the method comprising: obtaining a configuration of the vehicle, the configuration comprising descriptions of a plurality of units; obtaining specifications of a plurality of vulnerabilities, automatically matching at least one of the vulnerabilities with a plurality of units included in the configuration; automatically simulating an attack on the vehicle according to the matched vulnerabilities and the descriptions of the units, thereby identifying compromised units; automatically associating the vehicle with a first risk level value based on a criticality of the identified compromised units; and selecting at least one action to perform based on the first risk level value.

In another exemplary implementation, the methods further comprise, iteratively: selectively modifying attributes of at least one of the plurality of the identified compromised units to overcome at least one vulnerability; following the attribute modification, simulating an attack on the vehicle and recording a second risk level value; and if the second risk level value is lower than the first risk level value, providing a recommendation for improving the safety of the vehicle based on the attribute modification of the at least one identified compromised unit.

In yet another exemplary implementation, the methods further comprise: defining at least one attack vector traversing the plurality of units based on at least one connection between the plurality of units; and determining the first risk level value based on the set of the plurality of units traversed by the one attack vector.

In an exemplary implementation, the methods further comprise: defining at least one attack vector traversing (in other words, having a pathway through) the plurality of units (at least two or more) based on at least one connection between the plurality of units; and determining the first risk level value based on the set of the plurality of units traversed by the one attack vector.

These and other features of the systems and methods for providing ongoing cyber risk assessment to a vehicle fleet, will become apparent from the following detailed description when read in conjunction with the figures and examples, which are exemplary, not limiting.

BRIEF DESCRIPTION OF THE FIGURES

For a better understanding of the systems and method for providing ongoing cyber risk assessment to a vehicle fleet, with regard to the exemplary implementations thereof, reference is made to the accompanying examples and figures, in which.

DETAILED DESCRIPTION

Provided herein are exemplary implementations of systems and methods of iteratively and continually identifying, analyzing and remediating vulnerabilities of networked vehicle components to various malicious exploits.

In an exemplary implementation, provided herein is a unique, innovative, generic and global solution for proactive and continuous management of common vulnerabilities and exploits, and assessment for cars and other vehicle manufacturers (OEMs), service providers, car dealers and all those involved in the vehicles' supply chain. The disclosure is intended help large fleet owners improve cyber security response. Known vulnerabilities are evaluated in real time and corrective actions (as will be detailed herein) are initiated even before an attack occurs in a preemptive manner. The disclosed technology provided herein can also aid in compliance with national and international risk management regulations, for example, the ISO/TEC/SAE 21434 series standards, and other best practices, such as the Center for Internet Security's (CIS) "Critical Security Controls for Effective Cyber Defense (CIS CSC). By providing continuous and systematic monitoring of the software used in different car configurations, the disclosed technology provided herein can facilitate automatically the tracking of their cyber security status.

It is noted that OEMs will need to conform to the proposed UNECE WP.29 GRVA—REGULATION—to approve vehicles for their cyber security compliance and cybersecurity management systems. To show compliance, the vehicle manufacturer will have to demonstrate that the processes used within their Cyber Security Management System (CSMS) ensures security is adequate. The proposed systems and methods provided herein is instrumental in the following domains:

The processes used within the manufacturer's organization to manage cyber security;

The processes used for the identification of risks to vehicle types.

The processes used for the assessment, categorization and treatment of the risks identified;

The processes in place to verify that the risks identified are appropriately managed;

The processes used for ensuring that the risk assessment is kept current;

The processes used to monitor for, detect and respond to cyber-attacks, cyber threats and vulnerabilities on vehicle types and the processes used to assess whether the cyber security measures implemented are still effective in the light of new cyber threats and vulnerabilities that have.

In an exemplary implementation, risk assessment of vehicle functions (gear, brake, power, connected-car) (see e.g., FIG. 2), which are present in the asset, and (the module), is operable to use the information of the criticality of the various component in the system's architecture, the potential impact (for example safety) of malfunction of each component; and assigns importance (priority e.g.) for the remediation of each vulnerability. Additionally the risk assessment module scrutinizes the services in the asset and their interface to calculate and trace potential literal of any such identified vulnerability movement inside the system among the connected units (see e.g., FIG. 1; exposure map 310, and relevant attack vectors Map 320). The result of the risk assessment is in an exemplary implementation, a report of attack total impact and its influence on the entire car or the automotive OEM fleet.

In certain examples, the disclosed technology provided herein can be used for:

Proactive detection and management of vulnerabilities from several sources;

Automatically scraping and classification of vulnerabilities and exploit information;

Loading data profiling of the different fleet configurations (SW, FW, HW and connectivity);

Identification of affected car configurations, components and functions Ongoing monitoring, classification and assessment of relevant vulnerabilities;

Prioritization of relevant vulnerabilities based on total damage class score (essentially, a vulnerability index)

Compliance to risk management regulation and standards, e.g. ISO/IEC/SAE 21434

Notification and alert messages on new vulnerabilities affecting OEMs' fleets.

Accordingly and in an exemplary implementation, the disclosure provides for:

a computer-implemented method of evaluating risk for a vehicle;

automatically generating and presenting a sorted list of threat in the context of the OEM fleet;

automatically determining at least one modification to at least one of the units such that the risk level value is decreased;

automatically matching vulnerabilities with units and simulating an attack; and automatically the risk level based on the set of units traversed by the attack vector.

Figure 1:
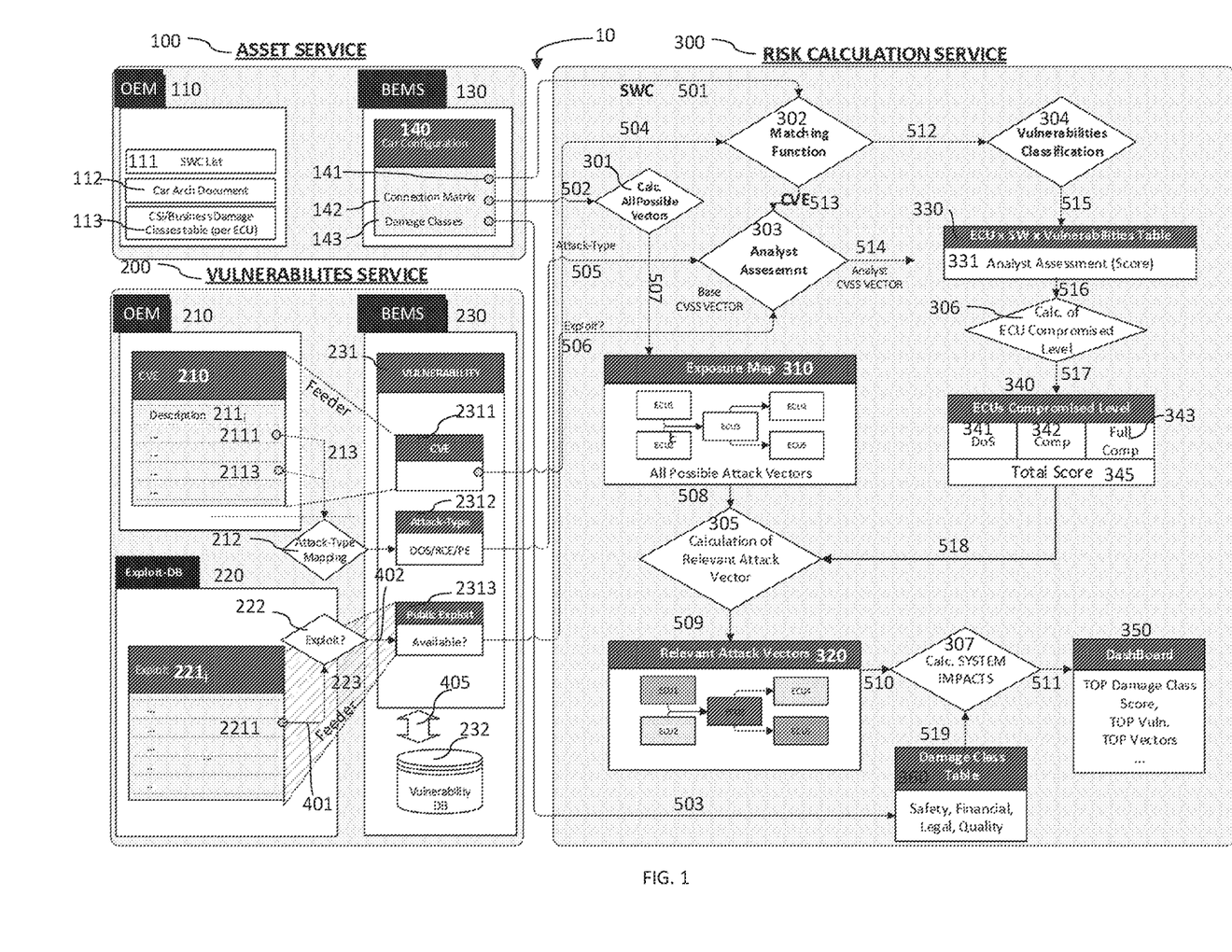
FIG. 1, illustrates the system's component architecture and the flow of information in forming the risk assessment.

Accordingly and in an exemplary implementation, the architecture, which is illustrated in FIG. 1, provided herein is a computer-implemented method of evaluating risk for a vehicle, implemented in a networked system comprising: asset service module 100, vulnerabilities module 200, and risk assessment module 300, the method comprising: obtaining a configuration of vehicle 110, the configuration comprising descriptions 211*i* of plurality of units 111, 112; obtaining specifications of plurality of vulnerabilities 230; automatically 501, 504 matching 302 at least one of the vulnerabilities 231 with plurality of units 111, 112, included in the configuration; automatically simulating an attack on the vehicle's plurality of units 111, 112 according to the matched vulnerabilities 330, and the descriptions 211*i* of the plurality of units 111, 112, thereby identifying 306 compromised units 340; automatically associating 518 the vehicle 110 with a first risk level value 345 based on a criticality of compromised units identified 340 in the step of simulating; and performing at least one action based on the vehicle-associated first risk level value.

In the context of the disclosure, the term "asset service module" refers to a "node" meaning any active device (e.g., host machine, server, switch, port, ECU, or the like) attached to a local computer network or telecommunication network (e.g., cellular, wide area network, or the internet). In this context, "asset" of a node refers to programmable devices, data, processes, software, hardware, and networks that are located in asset's service module.

The methods provided herein can further comprise generating and, using the display module-presenting a sorted (e.g., by criticality index) list of threats associated with the plurality of units determined to be compromised in simulation 350 according to at least one of: an attack type, an attack vector, attack surface, impact on privacy, impact on operational safety, deviation from a regulation (e.g., ISO/IEC/SAE 21434, UNECE WP.29 GRVA), compromise level of the plurality of units determined to be compromised in the simulation, and a criticality of components affected by the simulated attack. The attack type can be, for example, an unintended data disclosure, a denial of service (DoS), a remote code execution (RCE), unauthorized privilege association (PE), and a combination comprising one or more of the foregoing.

The attack vector analyzed in the systems and methods provided herein can comprise, for example, at least one of: a wide area network attack, a local area network attack, a USB port attack, a controller area network bus (CAN Bus) attack, a cellular network attack, and a serial port attack. For example, attack vectors can comprise the use of CDs Likewise the attack surface, referring to external interfaces for access to the plurality of units (see e.g., FIG. 2, for examples of the plurality of units continuously monitored by the systems and methods provided), these can be indirect physical attack surfaces, for example CD players, Shop tools, 3$^{rd}$ party media players, aftermarket components, charging stations, "pass through" devices and the like. Short range wireless attack surfaces can be, for example, Bluetooth, Keyless Entry, tire pressure monitoring system, dedicated short-range communication protocol, MID-based protocols used by engine immobilizers to identify the presence of a valid ignition key, and the like. Conversely, long-range wireless attack surfaces can be, for example Cellular, high-definition radio, radio data systems protocols, digital audio broadcasting, satellite radio, and the like.

The methods implemented using the systems provided can further comprise automatically (in other words, without human intervention) determining at least one modification to at least one of the units such that the first risk level value is decreased. Risk levels can be assessed based on several factors, for example, a vulnerability type, an exploit type, an impact, a remediation complexity, and a likelihood of occurrence. As used herein, the term "exploit" refers to actions that take advantage of a vulnerability in order to cause unintended and/or unanticipated behavior to occur on the computer software and/or hardware (in other words, the network node). An example of an exploit would be using a diagnostic port vulnerability to take advantage of a buffer overflow that allows access over Internet Protocol (IP) networks. Likewise, the term "vulnerability" refers to a weakness in a system or its associated networks' nodes, system security procedures, internal controls, or implementation that could be exploited to obtain unauthorized access to system resources. For instance, an open diagnostic port on an ECU is a vulnerability. The vulnerability type can be, for example, at least one of: a coding error, memory corruption, a buffer overflow, authentication protocol, authorization protocol, credentials association, a backdoor access, a wide area network access, and a dependency on, for example, unsecured mobile communication device.

In an exemplary implementation, the methods implemented using the systems described herein further comprise, iteratively (in other words, in a cyclic manner): selectively modifying attributes of at least one of the plurality of unit (nodes, e.g., ECU3, 310, FIG. 1) to overcome at least one identified vulnerability (e.g., in identified compromised ECU3); simulating an attack on the vehicle incorporating the now-modified attribute used to overcome the identified vulnerability; and recording a second risk level value (e.g., 331, FIG. 1); and if the second risk level value is lower than the first risk level value, either, providing a recommendation for improving the safety of the vehicle based on the modification of the at least one unit, or automatically modifying that attribute, wherein the at least one vulnerability sought to be overcome by modifying of attribute, is selected based on a set of scores 330, 331, associated with a respective set of vulnerabilities. The respective set of vulnerabilities further analyzed to determine, for example, if a known exploit is publicly available 2312, (505), and the vulnerability type 2313 (506). It is noted that the recording and calculating the second risk level can be done in a semi-automated manner or manually, using dedicated analysts (see e.g., FIG. 1, 303, 514).

Automatically modifying the attributes to reduce the risk of units (nodes) associated with telematics for example (see e.g., FIG. 2), may comprise in certain exemplary implementations, at least one of: secure the boot and software attestation process, debugging port authentication, performing over-the-air (OTA) software updates (reprogramming, both FOTA and SOTA), buffering overflow protection via address space layout randomization, detecting intrusion and prevention system, separating (compartmentalizing) ECUs responsible for motion (e.g., breaks, tire pressure, lane departure systems, blind spot detection systems, air bag deployment system, etc.), from ECUs responsible for other things such as navigation or entertainment, using trusted execution technology (e.g., trusted processor module), and the like.

Moreover, modifying attributes of at least one of the plurality of units comprises modifying at least one of: an attribute of a software module in the unit, an attribute of a hardware component in the unit, an operational mode of the unit, a physical connection related to the unit, and a logical connection (in other words, operable coupling) related to the unit. For example, these modifications may comprise at least one of: securing/installing on-board diagnostic (OBD) hardware coverings, installing CAN bus firewall, inserting message authentication codes, establishing ECU key management, installing CAN bus anomaly detection network monitor, initiating centralized authentication. Also, modifying the attributes to reduce the risk of at least one of the plurality of units associated with in-vehicle infotainment (IVI) module for example, may comprise at least one of: requiring digital signatures for applications, establishing embedded virtualization, establishing Wi-Fi password policy, instilling USB best practices, ensuring recovery by design, establishing Bug bounty.

In the context of the disclosure, the term "operable" and its derivatives used herein means that the device, module, system, logic unit, protocol etc, is able to operate or is adapted to operate for its desired functionality when the device, module, system, or logic unit is in off-powered state, and indicates that an item includes one or more of power connections, input(s), output(s), etc., to perform one or more its corresponding functions and may further include inferred coupling to one or more other device, module, system, logic unit, protocol etc.

Automatically matching 302 vulnerabilities 513 with the plurality of units and simulating an attack in the methods for continuously assessing cyber risk of vehicle functional units, are done in an exemplary implementation, according to an operational mode of at least one of the plurality of units. In other words, retrieving known vulnerabilities is matched against various units (e.g., ECUs) by, for example, exploiting the vulnerability under normal operating conditions for the particular unit. For example, the unit is an ECU in charge of the tire pressure monitoring system (TPMS) and the operational mode would be a battery power, ASIC for pressure monitoring and the proper RF components. The communication is between the sensors and an RF receiver usually found either in the trunk or glove box, using either the 315 mhz or 433 mhz frequency with encoding but not encryption. Next, vulnerability matched can be, for example finding a buffer overflow, or trying to register a fake sensor through the TPMS to the ECU.

As illustrated in FIG. 1, description of the plurality of units 211, relates to at least one of: a manufacture (e.g., 2111 etc.), a software module and version, a set of physical interfaces, and a set of logical interfaces. The term "logical interface" and the qualifier "logical" describe parameters (e.g., logical units (LUNs), ports, blocks, and addresses) which device controllers of resources in a direct- or network-attached environment utilize to target data blocks in non-volatile memory storage devices. These device controllers manage the actual mapping from logical addresses of fixed-length blocks to corresponding physical blocks on disks which could be distributed over an array of physical disk drivers (e.g., Redundant Array of Independent Disks, or RAID). While the internal workings of storage system controllers is beyond the scope of the present invention, the logical abstractions presented by the controllers to the network environment will be described; such controllers typically behave as target Small Computer Systems Interface (SCSI) devices.

Figure 2:
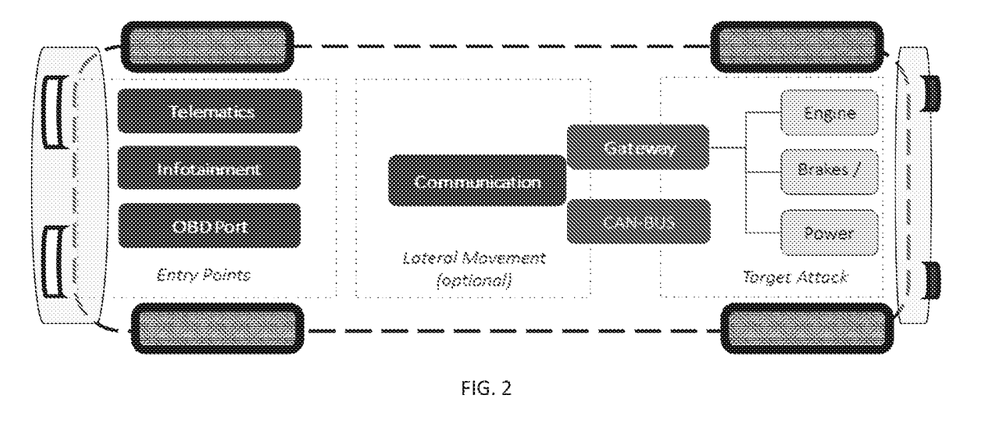
FIG. 2, illustrates a typical vehicle components' network.
Figure 3:
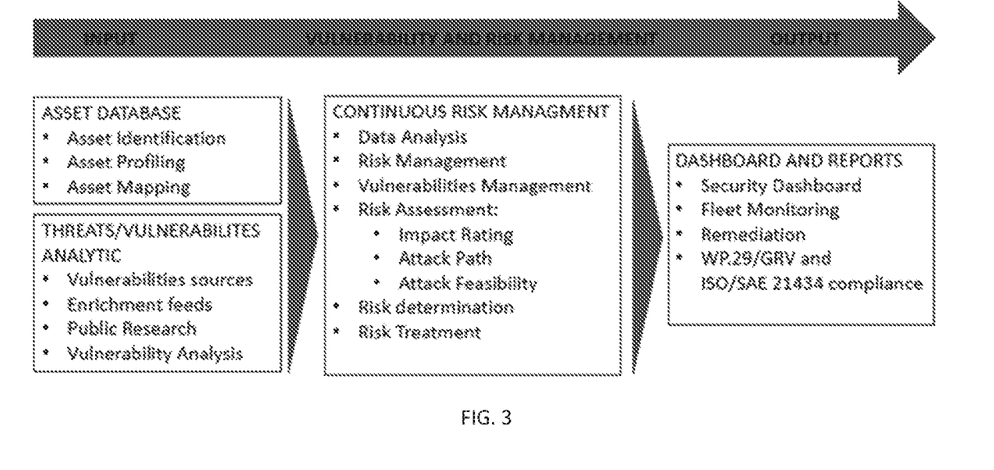
FIG. 3, is a schematic illustration of the risk assessment flow and one exemplary display result.

In an exemplary implementation, the methods implemented using the systems described herein further comprise defining at least one attack vector traversing the plurality of units based on at least one connection between the plurality of units; and determining the first risk level value based on the set of the plurality of units traversed by the one attack vector. As illustrated in FIG. 2, the units are interconnected for various reasons. An example of an exposure map 310 of networked units (ECU) is illustrated in FIG. 1. As shown, following calculation of all possible attack vectors 301, based on the car configuration 140, it seems that the target for the exploit would be ECU2. However, the same, single attack vector can traverse to $ECU_3$ and from there, to ECUs 4 and 5. Moreover, the attack vector's weighting as related to the risk score can be defined based on the operational mode of at least one of the plurality of units traversed by the one vector. Likewise, the connection between the plurality of units can be at least one of: a physical connection and a logical connection (in other words, RF, in-vehicle network, and the like).

At least one vulnerability in the methods and systems provided herein, can be selected based on a set of vulnerabilities, associated with a set of severities (see e.g., 360, FIG. 1). The severity will increase if the vulnerability is exploitable, however, the severity can be modified (upward or downward) following a software update, and/or public information.

In an exemplary implementation, the at least one (remediation) action based on the first risk level value selected can be, for example, a configuration modification, the method further comprising: determining the modification of the configuration such that the first risk level value is decreased; and suggesting the configuration modification to a user, or alternatively, automatically implementing the modification (e.g., OTA update). In other words, it may be that although ECU2 is vulnerable to an exploit E 310. Further analysis indicates that the most critical risk based on calculation of the relevant attack vectors 305, leads to the conclusion that ECU3 is the most critical unit (enabling e.g. remote code execution by an attacker and is associated with vehicle safety). Changing the configuration by, for example, inserting message authentication code to ECU3, will eliminate the threat or substantially reduce the probability for the exploit. The system will then highlight the vulnerability pathway and suggest the proper modification, or alternatively, automatically implementing the modification.

Specifically with regard to FIG. 1, and as illustrated, Asset module 100, comprises two (or more) subsystems a client server which can be the fleet owner or OEM 110, and the backend management server (BEMS) 130, The client server may be in continuous and updating communication with a database comprising software component (SWC) list 111, documentation about the car architecture 112, and CSI/Business damage class table 113, while the backend management server may comprise and/or be in communication with a database 140 comprising the connection matrix (see e.g., FIG. 2, and/or exposure map 310). In addition, the vulnerabilities module, again comprising the client server 210 (which can be the same or different than server 110) can comprise CVE description 211i, with specific CVEs 2111, and 2112 that are continuously fed 213 into backend management server's vulnerability monitoring module 2311 and from there 504 undergo matching function 302 to known ECU's monitored in the fleet's vehicles. The vulnerabilities module can also comprise exploits database, or server 220 which can be updated automatically or manually upon discovery of new exploits 221j, which feed 223 specific exploits 2211 to a determination query 222 and from there 402 to the backend management server's public exploit subsystem 2313. The CVE are also parsed as to their attack type and then classified 2312 and transferred 505 to the analyst assessment query 303 (which can be done by a dedicated team, rather than automatically. The classified vulnerabilities can then be stored 405 on a self-updating vulnerability database 232.

Using the car configuration subsystem 501 and the data on ascertained publicly available exploits 504, the matching function 302 is employed to associate the CVE with the plurality of units or ECUs. Simultaneously, considering all possible vectors 301, fed 502 by backend management server car configuration 140, the system establishes the most likely initial target unit (e.g., $ECU_2$), and from the established connection matrix, 142, provide (and render) exposure map 310. With the matching operation, the CVE are also classified 304 and a vulnerabilities table 330 detailing the ECU, the SWC and the associated vulnerability is generated 515. Using information about the attack type 505 and the availability of public exploit 506, the analysts conduct an additional assessment 303, and produce 514 via a common vulnerability end exploit scoring system, an analyst assessment score 331. The exposure map 310, detailing the exploit and its available path to other vulnerable UCUs is fed 508, to a sub system configured to incorporate and calculate relevant (in other words, most likely under the operational factors of the ECUs in the pathway) attack vectors. In parallel, the CVEs from the analysts score assessment 331, are input 516 to calculate the compromise level of the affected ECU 306, in terms of severity concerning, for example, DoS 341, RCE 342, and PE 343, leading to a revised score 345. That revised, ranked score 345 is cross referenced 518 against the relevant attack vectors 305, yielding 509 a revised exposure heat map 320, illustrating the critical ECUs weighted by the relevant attack vector and the attack type. Using the revised exposure map 320, as well as damage class table 360 provided 503 by the asset module 100 backend management server 130, to the system impact calculator 307, all the processed data is rendered 511 onto a single dashboard 350, with a ranked list of the top damage class score (e.g., safety, financial, legal, quality, reputation), top vulnerability, and top vectors. The dashboard can further provide the recommendation for remediation and once selected, iteratively, recalculate the overall system impact.

The term "system" shall also be taken to include any collection of systems or sub-systems that individually or jointly execute a set, or multiple sets, of instructions to perform one or more functions. Also, the term "system" refers to a logical assembly arrangement of multiple devices and is not restricted to an arrangement wherein all of the component devices are in the same housing.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads).

In addition, the computer program (software and/or firmware), can comprise program code means for carrying out the steps of the methods described herein, as well as a computer program product comprising program code means stored on a medium that can be read by a computer and a processor, such as a hard disk, CD-ROM, DVD, USB memory stick, or a storage medium that can be accessed via a data network, such as the Internet or intranet, when the computer program product is loaded in the main memory of a computer and is carried out by the computer.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, central processing module may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as network feature editing (NFE) topology into other data similarly represented as physical and structural layers.

As may also be used herein, the terms "communication processing module" (CPM), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). Processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information.

As used herein, the term "processor" is defined as including, but not necessarily being limited to, an instruction execution system such as a computer/processor-based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof. In addition, the computer program (software and/or firmware)), can comprise program code means for carrying out the steps of the methods described herein, as well as a computer program product comprising program code means stored on a medium that can be read by a computer, such as a hard disk. SATA CD-ROM, DVD, USB memory stick, or a storage medium that can be accessed via a data network, such as the Internet or Intranet, when the computer program product is loaded in the main memory of a computer and is carried out by the computer. Thus, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the exploit(s) includes one or more exploit). Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly and in an exemplary implementation, provided herein is a computer-implemented method of evaluating risk for a vehicle, the method comprising: obtaining a configuration of the vehicle, the configuration comprising descriptions of a plurality of units wherein the units are networked and in communication with other units in the vehicle; obtaining specifications of a plurality of vulnerabilities; automatically matching at least one of the vulnerabilities with the plurality of units included in the vehicle configuration; automatically simulating an attack (e.g., using at least one matched vulnerability) on the vehicle according to the matched vulnerabilities and the descriptions of the units, thereby identifying compromised units; automatically associating the vehicle with a first risk level value based on a criticality of the identified compromised units; and selecting at least one action to perform based on the first risk level value (or alternatively, automatically implementing the action), wherein (i) prior to the step of selecting to perform at least one action based on the first risk level value (or alternatively, automatically implementing the action), further automatically generating and presenting to a user, a sorted list of threats according to at least one of: an attack type, an attack vector, attack surface (in other words, one or more elements through which an attacker gains access to a system), impact on privacy, impact on safety, deviation from a regulation, compromise levels of units affected by the simulated attack, and a criticality of units affected by the simulated attack, further comprising (ii) automatically determining at least one modification to at least one of the units such that the first risk level value is decreased, further comprising (iii) iteratively: selectively modifying attributes of at least one of the plurality of unit operable to overcome at least one vulnerability; simulating an attack on the vehicle following the selective modification of the attributes operable to overcome the vulnerability, and recording a second risk level value resulting from the simulated attack; and if the second risk level value (in other words, the risk index) is lower than the first risk level value, providing a recommendation for improving the safety of the vehicle based on the modification of the at least one unit, or alternatively, automatically implementing the modification of the attribute, (iv) wherein the at least one vulnerability sought to be overcome by modifying of attribute, is selected based on a set of scores associated with a respective set of vulnerabilities, wherein (v) modifying attributes of at least one of the plurality of units comprises modifying at least one of: an attribute of a software module in the unit, an attribute of a hardware component in the unit, an operational mode of the unit, a physical connection related to the unit, and a logical connection related to the unit, wherein (vi) automatically matching vulnerabilities with the plurality of units and simulating an attack are done according to an operational mode of at least one of the plurality of units, wherein (vii) a description of the plurality of units relates to at least one of: a manufacture, a software module and version, a set of physical interfaces, and a set of logical interfaces, wherein the method further comprising (viii) defining at least one attack vector traversing (in other words, moving through, targeting other nodes while not necessarily affecting the nodes it is traversing through) the plurality of units based on at least one connection between the plurality of units; and determining the first risk level value based on the set of the plurality of units (e.g., ECU1→ECU3→ECU5) traversed by the one attack vector, wherein (ix) the attack vector is defined based on an operational mode of at least one of the plurality of units traversed by the one vector (e.g., ECU1, ECU3, ECU5), (x) the connection between the plurality of units (e.g., ECU1, ECU3, ECU5) is at least one of: a physical connection and a logical connection, the method (xi) further comprising: associating a set of vulnerabilities with a respective set of severities; and based on the associated vulnerabilities and their corresponding severity, generating and presenting a list of sorted attack types for at least one of the plurality of units to a user, (xii) wherein the severity is increased if the vulnerability is exploitable, (xiii) the severity is modified after an update of a software component (it is noted that software modification can either reduce the severity or increase the severity), wherein (xiv) the severity is modified based on public information, wherein (xv) the at least one action based on the first risk level value selected is: a configuration modification, the method further comprising: determining the modification of the configuration such that the first risk level value is decreased and suggesting the configuration modification to a user, or alternatively, automatically implementing the proposed configuration modification, and (xvi) automatically generating and updating the configuration of the vehicle by automatically identifying at least one of: a software unit and a hardware unit in a vehicle and modifying the software and/or firmware.

Although the foregoing disclosure has been described in terms of some exemplary implementations, other exemplary implementations will be apparent to those of ordinary skill in the art from the disclosure herein. Moreover, the described exemplary implementations have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications wilt be apparent to the skilled artisan in view of the disclosure herein.

What is claimed:
1. A computer-implemented method of evaluating risk for a vehicle, the method comprising:
   a. obtaining a configuration of the vehicle, the configuration comprising descriptions of a plurality of units;
   b. obtaining specifications of a plurality of vulnerabilities;

c. automatically matching at least one of the vulnerabilities with the plurality of units included in the configuration;
d. automatically simulating an attack on the vehicle according to the matched vulnerabilities and the descriptions of the units, thereby identifying compromised units;
e. automatically associating the vehicle with a first risk level value based on a criticality of the identified compromised units;
f. selecting at least one action to perform based on the first risk level value, wherein the selected at least one action is a configuration modification;
g. determining the configuration modification such that the first risk level value is decreased; and
h. suggesting the configuration modification to a user.

2. The method of claim 1, prior to the step of selecting to perform at least one action based on the first risk level value, further comprising automatically generating and presenting a sorted list of threats according to at least one of an attack type, an attack vector, attack surface, impact on privacy, impact on safety, deviation from a regulation, compromise levels of units affected by the simulated attack, or a criticality of units affected by the simulated attack.

3. The method of claim 1, further comprising automatically determining at least one modification to at least one of the units such that the first risk level value is decreased.

4. The method of claim 1, further comprising, iteratively:
a. selectively modifying attributes of at least one of the plurality of unit to overcome at least one vulnerability;
b. simulating an attack on the vehicle and recording a second risk level value; and
c. if the second risk level value is lower than the first risk level value, providing a recommendation for improving the safety of the vehicle based on the modification of the at least one unit.

5. The method of claim 4, wherein the at least one vulnerability sought to be overcome by selectively modifying attributes is selected based on a set of scores associated with a respective set of vulnerabilities.

6. The method of claim 5, wherein modifying attributes of at least one of the plurality of units comprises modifying at least one of an attribute of a software module in the unit, an attribute of a hardware component in the unit, an operational mode of the unit, a physical connection related to the unit, or a logical connection related to the unit.

7. The method of claim 1, wherein automatically matching vulnerabilities with the plurality of units and simulating an attack are done according to an operational mode of at least one of the plurality of units.

8. The method of claim 1, wherein a description of the plurality of units relates to at least one of a manufacture, a software module and version, a set of physical interfaces, or a set of logical interfaces.

9. The method of claim 1, further comprising:
a. defining at least one attack vector traversing the plurality of units based on at least one connection between the plurality of units; and
b. determining the first risk level value based on the set of the plurality of units traversed by the one attack vector.

10. The method of claim 9, wherein the attack vector is defined based on an operational mode of at least one of the plurality of units traversed by the one vector.

11. The method of claim 9, wherein the connection between the plurality of units is one of a physical connection or a logical connection.

12. The method of claim 1, further comprising:
a. associating a set of vulnerabilities with a respective set of severities; and
b. generating and presenting a list of attack types for at least one of the plurality of units.

13. The method of claim 12, wherein the severity is increased if the vulnerability is exploitable.

14. The method of claim 12, wherein the severity is modified after an update of a software component.

15. The method of claim 12, wherein the severity is modified based on public information.

16. The method of claim 1, comprising automatically generating and updating the configuration of the vehicle by automatically identifying at least one of a software unit or a hardware unit in a vehicle.

17. The method of claim 16 wherein the determining a second risk level value of the asset node based on the simulation is performed by a human operator.

18. The computer-implemented method of claim 16 further comprising: transmitting to a display at least one of the second risk level value, one or more results of the simulation, or at least one recommended attribute modifications.

19. The computer-implemented method of claim 16 wherein the at least one attack vector comprises at least one of an unintended data disclosure, a denial of service (DOS), a remote code execution (RCE), or an unauthorized privilege association (PE).

20. The computer-implemented method of claim 16 further comprising:
simulating the at least one attack vector traversing a plurality of nodes based at least partially on at least one connection between the at least one asset node and the plurality of nodes.

21. A non-transitory computer-readable medium for evaluating cyber risk for a vehicle, the medium including instructions that when executed on a computer processor cause the processor to:
a. obtain a specification of at least one node;
b. obtain a description of at least one cybersecurity vulnerability related to the at least one node;
c. identify at least one exploit associated with the at least one vulnerability;
d. simulate at least one attack vector on the at least one node, wherein the simulated attack vector is based at least in part on at least one identified exploit;
e. identify an attack vector vulnerability of the at least one node based at least in part on the simulated attack;
f. associate the vehicle with a first risk level value based on a criticality of the attack vector vulnerability;
g. select at least one action to perform based on the first risk level value, wherein the selected at least one action is a configuration modification;
h. determine the configuration modification such that the first risk level value is decreased; and
i. suggest the configuration modification to a user.

* * * * *